United States Patent Office 3,164,573
Patented Jan. 5, 1965

3,164,573
ALLYL ESTERS OF BICYCLIC CARBOXYLIC
ACIDS AND POLYMERS THEREOF
George C. Schweiker, Mountainside, N.J., assignor to Velsicol Chemical Corporation, Chicago, Ill., a corporation of Illinois
No Drawing. Filed Feb. 16, 1961, Ser. No. 89,653
15 Claims. (Cl. 260—78.5)

This invention relates to new chemical compounds and polymers thereof. More particularly, this invention relates to new allyl esters of bicyclic carboxylic acids and the polymeric compositions derived therefrom.

The new chemical compounds of the present invention have the following formula:

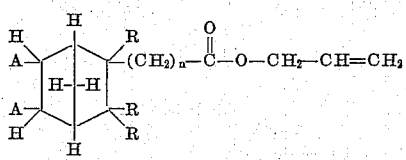

wherein R is selected from the group consisting of hydrogen and alkyl groups containing from 1 to 4 carbon atoms, the A's are selected from the group consisting of hydrogen and an olefinic bond, and $n$ is an integer from 0 to 10.

The new chemical compounds of the present invention can be readily polymerized to produce solid homopolymers having reoccurring structural units of the formula

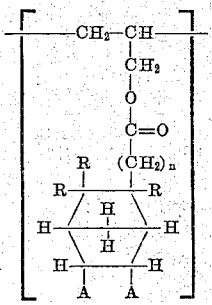

wherein R is selected from the group consisting of hydrogen and an alkyl group containing from 1 to 4 carbon atoms, the A's are selected from the group consisting of hydrogen and an olefinic bond, and $n$ is an integer from 0 to 10.

The number of reoccurring structural units ($m$) is directly related to the molecular weight of the particular homopolymer. The number of reoccurring structural units in the individual molecules of the homopolymers of the present invention may vary from 2 to about 50. Homopolymers of the present invention wherein ($m$) is from about 5 to about 25 have greater relative solubility and other improved properties, and are therefore preferred.

The number of reoccurring structural units in any given homopolymer can be approximately calculated by dividing the experimentally determined molecular weight of the polymer by the molecular weight of the monomeric compound. Thus it can readily be seen that "$m$" calculated in the above manner represents the average number of units in the homopolymer molecule.

The homopolymers of the present invention are unlike homopolymers of the vinyl esters of the bicyclicheptene acids. The vinyl esters of the class described cross-link upon polymerization to form hard, nonmoldable, solvent-insoluble polymers. The homopolymers of the present invention, on the other hand, have low molecular weight, are readily moldable, and are soluble in the common aromatic hydrocarbon solvents. These differences between the homopolymers of the present invention and the homopolymers of the vinyl esters, also serve to point out the valuable advantages possessed by the homopolymers of this invention.

The compounds of the present invention wherein the A's are an olefinic bond can be readily polymerized under polymerization conditions to produce valuable homopolymers soluble in the aromatic hydrocarbons, having low molecular weight, and the capability of being thermally treated to give hard insoluble products. These homopolymers have the desirable characteristics of being easily molded while in the soluble state and of being permanently set at elevated temperatures, for example, between about 200–500° C. for several minutes, by being substantially crosslinked at the olefinic bonds. Furthermore, a solution of these soluble homopolymers in aromatic solvent forms excellent coating which can be thermally set by baking at elevated temperatures.

These cyclic unsaturated compounds can also be copolymerized with similar polymerizable compounds, such as the vinyl aromatic compounds and the maleic acid or maleic anhydride type compounds, to yield copolymers having a wide and diverse range of properties.

The compounds of the present invention wherein the A's are hydrogen, also form homopolymers which are soluble in the aromatic hydrocarbons. However, as these homopolymers lack sites for crosslinking, they remain easily moldable and do not set at elevated temperatures. These compounds also can be copolymerized as described previously, yielding copolymers oftentimes having properties distinct from the properties of the cyclic unsaturated copolymers.

Thus, it is one object of the present invention to provide polymeric material, which can be easily molded and subsequently permanently set by thermal treatment.

It is another object of the present invention to provide polymeric material which is soluble in aromatic hydrocarbons before setting, and insoluble after setting.

Another object of the present invention is to provide monomeric compounds, which upon homopolymerization from homopolymers useful as an ingredient in the manufacture of films and coatings.

Still another object of the present invention is to provide copolymeric material useful in the production of a variety of films, coatings, and molded products.

These and other objects of the present invention will be apparent from the ensuing description.

The new ester compounds of the present invention can be readily prepared by esterification of the corresponding bicyclic acid. Bicyclic acids usable herein can be prepared by a Diels-Alder adduction of cyclopentadiene as the diene and as the dienophile, the proper monounsaturated aliphatic acid, such as acrylic acid, methacrylic acid, crotonic acid, β,β-dimethylacrylic acid, vinylacetic acid, β-methylvinylacetic acid, tiglic acid, γ,γ-dimethylvinylacetic acid, allylacetic acid, γ-methylallylacetic acid, methylcrontonic acid, ethylcrotonic acid, 5-hexenoic acid, 9-decenoic acid, 10-undecenoic acid, and the like. The bicyclic-heptene acid thus formed, can be esterified directly with allyl alcohol, to form the compounds of this invention wherein the A's are an olefinic bond, or can be esterified by any other method known to the art.

The bicyclic-heptene acid can be readily hydrogenated to form the bicyclic-heptane acid, which in turn can be esterified with allyl alcohol to form the allyl ester compounds of the present invention, wherein the A's are hydrogen.

Specifically, the Diels-Alder adduct of cyclopentadiene and the proper monounsaturated aliphatic acid can be prepared by any of the means common to the art. For example, bicyclo[2.2.1]hept-5-en-2-carboxylic acid can be prepared by contacting acrylic acid and cyclopentadiene at about 25–75° C. until the reaction ceases to be exothermic. Bicyclo[2.2.1]hept-5-en-2-acetic acid can be prepared by the method just described or by preparing the corresponding bicyclo[2.2.1]hept-5-en-2-acetonitrile by reacting allyl cyanide with cyclopentadiene in a pressure bomb, treating the acetonitrile with an alkali metal hydroxide, such as sodium hydroxide, and acidifying with a mineral acid to yield the desired bicyclo[2.2.1]hept-5-en-2-acetic acid.

To obtain the saturated cyclic acids, the unsaturated cyclic acid thus produced is hydrogenated with hydrogen gas in the presence of a hydrogenation catalyst, such as palladium or platinum on charcoal.

The new esters of the present invention can be readily produced by direct esterification of the proper acid with allyl alcohol in the presence of an acidic catalyst, such as paratoluenesulfonic acid. Alternatively, the new esters can be produced by converting the proper bicyclic acid to its alkali metal salt by treatment with an alkali metal hydroxide, such as potassium hydroxide, and reacting the isolated acid salt with allyl chloride in a refluxing solvent, such as methanol. The ester of the present invention is then recovered by the commonly known processes of solvent stripping, extraction from water, and drying, or by any of the other concentration processes common to the art.

The homopolymers of the present invention can readily be prepared by many of the polymerization processes known to the art, such as by the bulk, solution, or emulsion processes. The polymerization of the esters of this invention by the said processes requires a polymerization catalyst, such as the peroxide catalysts, or the redox catalysts. An example of a peroxide catalyst is benzoyl peroxide, while an example of a redox catalyst system is an aqueous solution of ferrous sulfate heptahydrate, potassium persulfate, and sodium bisulfate. A suitable quantity of catalyst is from about 1 part to about 20 parts by weight of catalyst per 100 parts by weight of monomeric reactant.

Bulk polymerizations are performed by contacting the monomer composition of the present invention with a polymerization catalyst. The temperature of the mixture is increased until a reaction begins and thereafter is maintained to control the course of the polymerization. The reaction is deemed complete when the reaction ceases and can no longer be sustained at slightly increased tempratures. The homopolymeric product can be recovered by simply pouring the products out of the reaction vessel if the product is a liquid, or if solid, the solid can be dissolved in a suitable solvent, such as benzene, and precipitated from an excess of a solvent such as pentane, in which the homopolymer has decreased solvency.

Solution polymerizations are readily performed by dissolving a compound of the present invention and catalyst, as heretofore described, in a solvent, such as benzene. The amount of solvent is not critical and should be present in sufficient quantity to afford good polymerization control. In general, a monomer solution of about 10% to about 30% by weight monomer in solvent has been found satisfactory. The solution is heated to reflux and refluxing is continued until the polymerization is complete. The homopolymeric product thus produced can be readily isolated from the solvent solution by mixing the solution with an excess of a solvent in which the product has decreased solvency, such as pentane, and separating the precipitated hompolymer therefrom. The homopolymer is next dried by vacuum, low heat, or a combination of the two, to yield the dry valuable product.

Emulsion polymerizations are readily performed by agitating an ester of the present invention with water, catalyst, and a small quantity of an emulsifier. Suitable portions of reactants are: allyl ester as described herein, 10–40 parts by weight; water, 10–40 parts by weight; catalyst, 0.1–10 parts by weight; and emulsifier, 0.05–5 parts by weight. Suitable emulsifiers for this polymerization reaction are the anionic type emulsifiers such as sodium stearate, potassium laurate, morpholine laurate, sodium lauryl sulfate, sodium 2-ethylhexyl sulfate, sodium naphthalenesulfonate, sodium alkylnaphthalene sulfate, and the like. The emulsion is heated for several hours. The total reaction mixture is poured into an excess amount of a solvent in which the polymer has decreased solvency, such as pentane, to precipitate the homopolymer of the present invention. The dry polymer is isolated by filtering the precipitate and drying at atmospheric or subatmospheric pressure.

The polymerizations as described herein proceed readily at atmospheric pressure at temperatures from about 25° C. to about 200° C. A preferable reaction temperature is from about 75° C. to about 150° C. Superatmospheric pressures can be used with equal success. Increasing the temperature of the polymerization has the effect of decreasing the time required and increasing thermal crosslinking in polymers containing the cyclic olefin bond. Increases in the time of polymerization result in higher yields of polymer, within a maximum limit. Increasing the concentration of the catalyst increases the conversion of monomer up to a limiting concentration and decreases the time required for polymerization. The use of a solvent decreases thermal crosslinking, but also greatly decreases the yield of polymer and requires a longer time and larger amount of catalyst.

The copolymers of the present invention can similarly be readily prepared by copolymerizing a sutiable polymerizable compound with an allyl ester of the present invention. The processes, conditions, catalysts, etc. described for the homopolymerizations apply equally to the copolymerizations. Suitable polymerizable compounds are the vinyl aromatic compounds of the formula

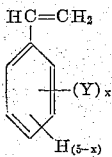

wherein Y is selected from the group consisting of chlorine, bromine, carboxyl, methyl, ethyl, and mixtures thereof, and $x$ is an integer from 0 to 2; and the compounds of the formula

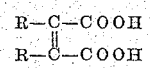

wherein R is selected from the group consisting of hydrogen and alkyl radicals containing 1 to 4 carbon atoms and their anhydrides.

Examples of suitable vinyl aromatic compounds are: styrene, vinyltoluene, vinylxylene, vinylchlorobenzene, vinylchlorotoluene, vinylethylbenzene, vinylbenzoic acid, and vinyldichlorobenzene. Examples of the latter class of suitable compounds are: maleic acid, maleic anhydride, citraconic acid, citraconic anhydride, cis-aconitic acid, and cis-aconitic anhydride.

The following examples are presented to illustrate the preparation of the allyl esters, the homopolymers, and the copolymers of the present invention.

EXAMPLE 1

*Preparation of Bicyclo[2.2.1]Hept-5-En-2-Carboxylic Acid*

Into a 300 ml. three-necked, round-bottom flask equipped with a stirrer, thermometer, condenser, and addition funnel, was placed acrylic acid (158 gm.; 2.1 mols). Cyclopentadiene (165 gm.; 2.5 mols) was slowly added from the addition funnel over a period of one hour while the contents of the flask were vigorously stirred. The temperature was maintained at 35–40° C. during the addition by use of a water bath. Stirring was continued until the exotherm ceased to be apparent. The solution was allowed to stand for three days, was then distilled under reduced pressure, and the fraction boiling at 126–128° C. at 12 mm. mercury collected and redistilled to obtain an 80% yield of bicyclo[2.2.1]hept-5-en-2-carboxylic acid, boiling at 85° C. at 0.6 mm. mercury.

EXAMPLE 2

*Preparation of Allyl Bicyclo[2.2.1]Hept-5-En-2-Carboxylate*

Into a 500 ml. three-necked, round-bottom flask equipped with a thermometer, a Dean-Stark trap, and a condenser, were placed bicyclo[2.2.1]hept-5-en-2-carboxylic acid (81 gm.; 0.59 mol), allyl alcohol (58 gm.; 1 mol), paratoluenesulfonic acid (2 gm.), and benzene (200 ml.). The solution was heated at reflux with the water produced by the reaction being collected in the Dean-Stark trap. The reaction was allowed to continue for 22 hours. At the end of this period, the solution was cooled and the benzene solvent removed by distillation at atmospheric pressure under a blanket of nitrogen gas until a pot temperature of 135° C. was reached. The residue was then distilled in vacuo to obtain allyl bicyclo[2.2.1]hept-5-en-2-carboxylate, a colorless liquid boiling at 102–106° C. at 12 mm. mercury.

The product had the following elemental analysis as calculated for $C_{11}H_{14}O_2$:

|  | C | H |
| --- | --- | --- |
| Theoretical, percent | 74.12 | 7.91 |
| Found, percent | 73.86 | 7.91 |

EXAMPLE 3

*Preparation of Bicyclo[2.2.1]Hept-5-En-2-Acetonitrile*

Into a 500 ml. stainless steel bomb was placed allyl cyanide (117 gm.; 1.75 mols) and dicyclopentadiene (82 gm.; 0.625 mol). The bomb was flushed with nitrogen gas, sealed, and placed in a salt bath maintained at 400° F. After 4 hours, the bomb was removed from the bath, cooled, and the reaction mixture ditsilled in vacuo to recover 111 gm. of bicyclo[2.2.1]hept-5-en-2-acetonitrile, boiling at 105–120° C. at 19 mm. mercury.

EXAMPLE 4

*Preparation of Bicyclo[2.2.1]Hept-5-En-2-Acetic Acid*

Into a 500 ml. three-necked, round-bottom flask equipped with a reflux condenser were placed bicyclo[2.2.1]hept-5-en-2-acetonitrile (90 gm.; 0.67 mol; prepared in Example 3), sodium hydroxide (80 gm.; 2 mols), and water (250 ml.). The mixture was heated at reflux for 24 hours, at which time ammonia gas ceased to exude therefrom. The solution was cooled and acidified by adding incremental quantities of hydrochloric acid. The product acid was extracted from the reaction solution with portions of diethyl ether (150 ml.). The ether extract was washed with water (50 ml.), dried over anhydrous magnesium sulfate, and filtered from the solid drying agent. Ether was removed from the extract on a steam bath and the residue distilled in vacuo to yield bicyclo[2.2.1]hept-5-en-2-acetic acid, boiling at 148–155° C. at 19 mm. mercury.

EXAMPLE 5

*Preparation of Allyl Bicyclo[2.2.1]Hept-5-En-2-Acetate*

Into a 500 ml. three-necked, round-bottom flask equipped with a thermometer, a Dean-Stark trap, and a condenser, were placed bicyclo[2.2.1]hept-5-en-2-acetic acid (65 gm.; 0.43 mol; prepared in Example 4), allyl alcohol (30 gm.; 0.52 mol), paratoluenesulfonic acid (1 gm.), and benzene (250 ml.). The solution was heated at reflux for 22 hours with the water produced by the reaction being collected in the Dean-Stark trap. At the end of this period, the solution was cooled and the benzene solvent removed by distillation at atmospheric pressure under a blanket of nitrogen gas until a pot temperature of 135° C. was reached. The residue was then distilled in vacuo to yield allyl bicyclo[2.2.1]hept-5-en-2-acetate, a colorless liquid boiling at 131–133° C. at 22 mm. mercury.

The product had the following elemental analysis as calculated for $C_{12}H_{16}O_2$:

|  | C | H |
| --- | --- | --- |
| Theoretical, percent | 74.89 | 8.39 |
| Found, percent | 74.85 | 8.39 |

EXAMPLE 6

*Preparation of 2-Methyl-Bicyclo[2.2.1]Hept-5-En-2-Carboxylic Acid*

Into a one-liter three-necked, round-bottom flask equipped with stirrer, condenser, thermometer, and addition funnel, were placed methacrylic acid (478 gm.; 5.6 mols) and hydroquinone (1 gm.). Cyclopentadiene (366 gm.; 5.6 mols) was added to the flask through the addition funnel over a period of one hour, while the reaction solution was heated to a temperature of 37° C. by means of a heating mantle. Thereafter, the heat of the reaction maintained the reaction temperature at 37–39° C. for 6 hours. The reaction solution was allowed to stand for 16 hours, after which it was distilled in vacuo to yield 2-methylbicyclo[2.2.1]hept-5-en-2-carboxylic acid, which boiled at 128–134° C. at 12–14 mm. mercury.

EXAMPLE 7

*Preparation of Allyl 2-Methyl-Bicyclo[2.2.1]Hept-5-En-2-Carboxylate*

2-methylbicyclo[2.2.1]hept-5-en-2-carboxylic acid (109 gm.; 0.71 mols) was dissolved in methanol (200 ml.) and a solution of potassium hydroxide (40 gm.; 0.71 mols) dissolved in methanol (150 ml.) was added to it. The methanol was removed under vacuum and the residue was air-dried to yield 135 gm. of the potassium salt of the acid, which was then dissolved in methanol (200 ml.) and poured into a 500 ml. three-necked, round-bottom flask equipped with a mechanical stirrer, reflux condenser, and internal thermometer. Allyl chloride (60 gm.; 0.78 mols) was added to the flask, and the contents heated at reflux for 17 hours by means of a heating mantle. The methanol was removed by distillation at atmospheric pressure under a blanket of nitrogen. The residue was mixed with water (100 ml.) and extracted with diethyl ether (200 ml.). The ether layer was then separated from the aqueous layer, dried over anhydrous magnesium sulfate, filtered, and distilled on a steam bath to remove the ether solvent. The residue therefrom was distilled in vacuo to yield allyl 2-methylbicyclo[2.2.1]hept-5-en - 2 - carboxylate, which boiled at 107–111° C. at 17 mm. mercury.

The product had the following elemental analysis as calculated for $C_{12}H_{16}O_2$:

|  | C | H |
|---|---|---|
| Theoretical, percent | 74.96 | 8.39 |
| Found, percent | 74.54 | 8.20 |

EXAMPLE 8

*Preparation of Bicyclo[2.2.1]Heptan-2-Carboxylic Acid*

In to a 500 ml. glass pressure bottle was placed bicyclo[2.2.1]hept-5-en-2-carboxylic acid (138 gm.; 1 mol), methanol (50 ml.) and 10% palladium on carbon catalyst (2 gm.). The bottle was placed in a Parr hydrogenation apparatus, evacuated, and was pressured with hydrogen gas to 40 pounds per square inch 3 times, until hydrogen ceased to be taken into the reaction mixture. The bottle was removed from the apparatus and the catalyst separated from the reaction solution by filtration through a bed of hydrated amorphous silica. The reaction solution was poured into a 500 ml. distillation flask and the methanol solvent removed by atmospheric distillation and then by an aspirator. The residue was distilled in vacuo to yield bicyclo[2.2.1]heptan-2-carboxylic acid, boiling at 92–99° C. at 0.05–0.07 mm. mercury.

EXAMPLE 9

*Preparation of Allyl Bicyclo[2.2.1]Heptan-2-Carboxylate*

Into a 500 ml. three-necked, round-bottom flask equipped with a thermometer, Dean-Stark trap and condenser, were placed bicyclo[2.2.1]heptan-2-carboxylic acid (35 gm.; 0.25 mol), allyl alcohol (17 gm.; 0.3 mol), paratoluenesulfonic acid (1 gm.), and benzene (2250 ml.). The reaction mixture was heated at reflux for 12 hours, while the water produced by the reaction was collected in the Dean-Stark trap. The apparatus was modified for distillation, and most of the benzene was removed by atmospheric distillation. The residue was dissolved in diethyl ether (50 ml.), washed several times with a 10% solution of sodium bicarbonate and washed with water. The ether solvent was removed by atmospheric distillation, and the residue was distilled in vacuo to yield allyl bicyclo[2.2.1]-heptan-2-carboxylate, which boiled at 123–125° C. at 26 mm. mercury and solidified upon cooling.

EXAMPLE 10

*Preparation of Bicyclo[2.2.1]Heptan-2-Acetic Acid*

Into a 500 ml. glass pressure bottle was placed bicyclo[2.2.1]hept-5-en-2-acetic acid (153 gm.; 1 mol), methanol (100 ml.), and 10% palladium on carbon catalyst (2 gm.). The bottle was placed into a Parr hydrogenation apparatus, evacuated, and pressured with hydrogen gas to 40 pounds per square inch 3 times, until hydrogen ceased to be taken into the reaction mixture. The bottle was removed from the apparatus and the catalyst separated from the reaction solution by filtration through a bed of hydrated amorphous silica. The reaction solution was poured into a 500 ml. distillation flask and the methanol solvent removed by atmospheric distillation and then by an aspirator. The residue was distilled in vacuo to yield bicyclo[2.2.1]heptan-2-acetic acid, boiling at 153–156° C. at 18 mm. mercury.

EXAMPLE 11

*Preparation of Allyl Bicyclo[2.2.1]Heptan-2-Acetate*

Bicyclo[2.2.1]heptan-2-acetic acid (48.5 gm.; 0.25 mol), allyl alcohol (17 gm.; 0.3 mol), paratoluenesulfonic acid (1 gm.), and benzene (250 ml.) are charged into a 500 ml. three-necked, round-bottom flask equipped with a thermometer, Dean-Stark trap and condenser. The reaction solution is heated at reflux for about 20 hours. The water produced by the reaction is collected in the Dean-Stark trap. The apparatus is modified for distillation and most of the benzene removed by atmospheric distillation. The residue is dissolved in diethyl ether (100 ml.), washed several times with a 10% solution of sodium bicarbonate, and washed with water. The ether solvent is removed by atmospheric distillation, and the residue distilled in vacuo to yield allyl bicyclo[2.2.1]heptan-2-acetate.

The other bicycloheptane allyl esters of the present invention can also be prepared by the method of Examples 1 and 2. Thus, cyclopentadiene (denoted by "C") can be reacted with the designated dienophile to form the corresponding bicyclic acid, which in turn is reacted with allyl alcohol (denoted by "A") to form the desired ester of the present invention. Example 12 illustrates the preparation of several of the other esters of the present invention:

EXAMPLE 12

| Diene | Dienophile | Alcohol | Ester |
|---|---|---|---|
| C | +Crotonic Acid | +A | =Allyl 2-Methylbicyclo[2.2.1]-hept-5-en-3-carboxylate. |
| C | +Allylacetic Acid | +A | =Allyl bicyclo[2.2.1]hept-5-en-2-propionate. |
| C | +Methylvinylacetic Acid | +A | =Allyl 2-Methylbicyclo[2.2.1]-hept-5-en-2-acetate. |
| C | +3-Pentenoic Acid | +A | =Allyl 2-Methylbicyclo[2.2.1]-hept-5-en-3-acetate. |
| C | +Senecioic Acid | +A | =Allyl 2,2-Dimethylbicyclo[2.2.1]hept-5-en-3-carboxylate. |
| C | +Tiglic Acid | +A | =Allyl 2,3-Dimethylbicyclo[2.2.1]hept-5-en-2-carboxylate. |
| C | +Allylpropionic Acid | +A | =Allyl Bicyclo[2.2.1]hept-5-en-2-butyrate. |
| C | +γ-Methyl allylacetic Acid | +A | =Allyl 2-Methylbicyclo[2.2.1]-hept-5-en-2-propionate. |
| C | +4-Hexenoic Acid | +A | =Allyl 2-Methylbicyclo[2.2.1]-hept-5-en-3-propionate. |
| C | +Pyroterebic Acid | +A | =Allyl 2,2-Dimethylbicyclo[2.2.1]hept-5-en-3-acetate. |
| C | +Hydrosorbic Acid | +A | =Allyl 2-Ethylbicyclo[2.2.1]-hept-5-en-3-acetate. |
| C | +4-Vinylvaleric Acid | +A | =Allyl Bicyclo[2.2.1]hept-5-en-2-valerate. |
| C | +5-Methyl-5-hexenoic Acid | +A | =Allyl 2-Methylbicyclo[2.2.1]-hept-5-en-2-butyrate. |
| C | +4-Heptenic Acid | +A | =Allyl 2-Methylbicyclo[2.2.1]-hept-5-en-3-butyrate. |
| C | +3-Isoheptenic Acid | +A | =Allyl 2,2-Dimethylbicyclo[2.2.1]hept-5-en-3-propionate. |
| C | +6-Octenic Acid | +A | =Allyl Bicyclo[2.2.1]hept-5-en-2-caproate. |
| C | +3-Iso octenic Acid | +A | =Allyl 2-Isopropylbicyclo[2.2.1]hept-5-en-3-propionate. |
| C | +9-Decenoic Acid | +A | =Allyl Bicyclo[2.2.1]hept-5-en-2-caprylate. |
| C | +Isodecylenic Acid | +A | =Allyl 2-Methylbicyclo[2.2.1]-hept-5-en-3-oenanthylate. |
| C | +9-Undecylenic Acid | +A | =Allyl Bicyclo[2.2.1]hept-5-en-2-pelargonate. |
| C | +8-Undecylenic Acid | +A | =Allyl 2-Methylbicyclo[2.2.1]-hept-5-en-3-caprylate. |

The method of Examples 1 and 5 can be utilized to prepare the bicycloheptane acids, which can then be esterified by the method of Example 2 to prepare the bicycloheptane allyl esters of the present invention. Thus, cyclopentadiene (denoted by "C") can be reacted with the designated dienophile to form the corresponding bicycloheptene acid. This unsaturated acid is hydrogenated with hydrogen gas (denoted by "H") to form the corresponding bicycloheptane acid, which is esterified with allyl alcohol (denoted by "A") to produce the bicycloheptane allyl esters of the present invention. Example 13 illustrates the preparation of several of the bicycloheptane allyl esters of the present invention.

EXAMPLE 13

| Diene | Dienophile | Hydrogen | Alcohol | Ester |
|---|---|---|---|---|
| C | +Methacrylic Acid | +H | +A | =Allyl 2-Methylbicyclo[2.2.1]-heptan-2-carboxylate |
| C | +Crotonic Acid | +H | +A | =Allyl 2-Methylbicyclo[2.2.1]-heptan-3-carboxylate. |
| C | +Allylacetic Acid | +H | +A | =Allyl Bicyclo[2.2.1]heptan-2-propionate. |
| C | +Methylvinyl-acetic Acid | +H | +A | =Allyl 2-Methylbicyclo[2.2.1]-heptan-2-acetate. |
| C | +3-Pentenoic Acid | +H | +A | =Allyl 2-Methylbicyclo[2.2.1]heptan-3-acetate. |
| C | +Senecioic Acid | +H | +A | =Allyl 2,2-Dimethylbicyclo[2.2.1]heptan-3-carboxylate. |
| C | +Tiglic Acid | +H | +A | =Allyl 2,3-Dimethylbicyclo[2.2.1]heptan-2-carboxylate. |
| C | +Allylpropionic Acid | +H | +A | =Allyl Bicyclo[2.2.1]heptan-2-butyrate. |
| C | +γ-Methyl allyl-acetic Acid | +H | +A | =Allyl 2-Methylbicyclo[2.2.1]-heptan-2-propionate. |
| C | +4-Hexonioc Acid | +H | +A | =Allyl 2-Methylbicyclo[2.2.1]heptan-3-propionate |
| C | +Pyroterebic Acid | +H | +A | =Allyl 2,2-Dimethylbicyclo[2.2.1]heptan-3-acetate. |
| C | +Hydrosorbic Acid | +H | +A | =Allyl 2-Ethylbicyclo[2.2.1]-heptan-3-acetate. |
| C | +4-Vinylvaleric Acid | +H | +A | =Allyl Bicyclo[2.2.1.]heptan-2-valerate. |
| C | +5-Methyl-5-hexenoic Acid | +H | +A | =Allyl 2-Methylbicyclo[2.2.1]heptan-2-butyrate. |
| C | +4-Heptenic Acid | +H | +A | =Allyl 2-Methylbicyclo[2.2.1]heptan-3-butyrate. |
| C | +3-Isoheptenic Acid | +H | +A | =Allyl 2,2-Dimethylbicyclo[2.2.1]heptan-3-propionate |
| C | +6-Octenic Acid | +H | +A | =Allyl Bicyclo[2.2.1]heptan-2-caproate. |
| C | +3-Iso-octenic Acid | +H | +A | =Allyl 2-Isopropylbicyclo[2.2.1]heptan-3-propionate |
| C | +9-Decenoic Acid | +H | +A | =Allyl Bicyclo[2.2.1]heptan-2-caprylate. |
| C | +Isodecylenic Acid | +H | +A | =Allyl 2-Methylbicyclo[2.2.1]-heptan-3-oenanthylate. |
| C | +9-Undecylenic Acid | +H | +A | =Allyl Bicyclo[2.2.1]heptan-2-pelargonate. |
| C | +8-Undecylenic Acid | +H | +A | =Allyl 2-Methylbicyclo[2.2.1]heptan-3-caprylate. |

EXAMPLE 14

*Preparation of the Homopolymer of Allyl Bicyclo[2.2.1]Hept-5-En-2-Carboxylate*

Allyl bicyclo[2.2.1]hept-5-en-2-carboxylate (5 gm.) and benzoyl peroxide (0.05 gm.) were placed into an 18 x 150 mm. test tube. The test tube was placed in a constant temperature bath at 99° C. for 6 hours. The polymer thereby produced has a softening point of 45° C. and is free flowing at 100° C., as determined on a Fisher-Johns melting point apparatus; and is soluble in the aromatic solvents. Upon heating the polymer above 250° C., the polymer cured to a hard resin, which was insoluble in the aromatic solvents.

The homopolymer of allyl bicyclo[2.2.1]hept-5-en-2-carboxylate has reoccurring structural units of the formula

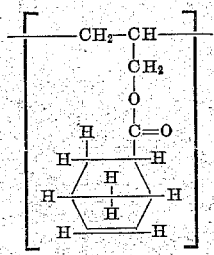

wherein *m* is an integer from 5 to 25.

The above bulk polymerization was repeated utilizing 0.25 gm. of benzoyl peroxide and a reaction time of 2 hours. The polymer thus produced had a molecular weight of 920 as determined cryoscopically, and an Ostwald viscosity (1% solution) at 25° C. of 0.04. Upon increasing the catalyst concentration to 0.5 gm., the molecular weight of the polymer increased to 1625. This latter concentration of catalyst and monomer, reacted for only ½ hour produced a homopolymer having a molecular weight of 1400, as determined cryoscopically. A fifth polymerization using 0.25 gm. of azo-bis (isobutyronitrile) was performed at 80° C. for 6 hours and produced a homopolymer having a molecular weight of 1240, as determined cryoscopically.

Films were prepared from the above homopolymers by dissolving the homopolymer in xylene to form a 6% solution which was coated onto tin plate by a doctor blade set at 3 mils. The coated plate was placed under a heat lamp for 5 minutes and then heated in an oven maintained at 400° F. for five minutes to thermally set the coating. The film thereby produced has good adhesion and flexibility.

EXAMPLE 15

*Preparation of the Homopolymer of Allyl Bicyclo[2.2.1]Hept-5-En-2-Acetate*

Allyl bicyclo[2.2.1]hept-5-en-2-acetate (5 gm.) and benzoyl peroxide (0.25 gm.) were reacted for 2 hours as described in Example 14 to yield a homopolymer having a softening point of 35° C. as determined on a Fisher-Johns melting point apparatus, and a molecular weight of 1625 as determined cryoscopically. The homopolymer also cured to an insoluble, hard polymer upon heating to temperatures above 270° C. A second identical polymerization produced a homopolymer having a molecular weight of 2100. Upon reaction of 5 gms. of the ester with 0.5 gm. benzoyl peroxide at 99° C. for only 1.5 hours, a homopolymer having a molecular weight of 1700 was produced. This latter homopolymer was dissolved in xylene to form a 20% solution which was coated upon a tin plate as described in the previous example. The coating thus produced and cured had excellent adhesion and flexibility, even after the coated tin plate was formed into a lid for a tin can.

The homopolymer of allyl bicyclo[2.2.1]hept-5-en-2-acetate has reoccurring structural units of the formula

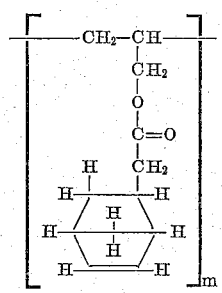

wherein *m* is an integer from 5 to 25.

EXAMPLE 16

*Preparation of a Homopolymer of Allyl 2-Methylbicyclo [2.2.1]Hept-5-En-2-Carboxylate*

Allyl 2-methylbicyclo[2.2.1]hept-5-en-2-carboxylate (5 gm.) and benzoyl peroxide (0.25 gm.) were placed into an 18 x 150 mm. test tube. The test tube was placed in a constant temperature bath at 99° C. for 1 hour. The homopolymer thus produced had a softening point of 55° C. and a molecular weight of 1700 as determined cryoscopically. The homopolymer flowed freely at 100° C., was soluble in the aromatic solvents, and thermally cured to a hard insoluble polymer at temperatures above 235° C.

The homopolymer of allyl 2-methylbicyclo[2.2.1]hept-5-en-2-carboxylate has reoccurring structural units of the formula

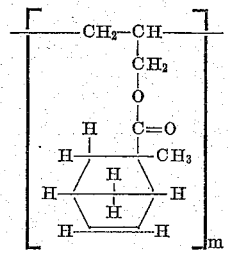

wherein *m* is an integer from 5 to 25.

EXAMPLE 17

*Preparation of a Momopolymer of Allyl Bicyclo[2.2.1]Heptan-2-Acetate*

Allyl bicyclo[2.2.1]heptan-2-acetate (5 gm.) and benzoyl peroxide (0.25 gm.) are placed into an 18 x 150 mm. test tube. The test tube is placed into a constant temperature bath at 100° C. for 2 hours. The polymer thus produced is soluble in the aromatic solvents and does not thermally set upon curing at increased temperatures.

Homopolymers of the other allyl esters of the present invention can be readily prepared by the method described in Examples 14–17 or by the other polymerization reactions described herein.

EXAMPLE 18

*Preparation of a Copolymer of Allyl Bicyclo[2.2.1]Hept-5-en-2-carboxylate and Styrene*

Allyl bicyclo[2.2.1]hept-5-en-2-carboxylate (3.16 gm.), styrene (1.84 gm.), and benzoyl peroxide (0.275 gm.) are placed into an 18 x 150 mm. test tube. The test tube is placed in a constant temperature bath at 100° C. for 6 hours to form the desired copolymer of the present invention.

EXAMPLE 19

*Preparation of a Copolymer of Allyl Bicyclo[2.2.1]Hept-5-En-2-Acetate and Maleic Acid*

Allyl bicyclo[2.2.1]hept-5-en-2-acetate (4.2 gm.), maleic acid (1.16 gm.), and benzoyl peroxide (0.25 gm.) are placed into an 18 x 150 mm. test tube. The test tube is placed in a constant temperature bath at 100° C. for 8 hours to form the desired copolymer of the present invention.

Similarly, the other copolymers of the present invention can be prepared by reacting an allyl ester of the present invention with a polymerizable compound as herein described.

The homopolymers of the present invention possess valuable utility as ingredients in adhesives and as films and surface coatings. This utility is enhanced by the solubility of the polymers in the aromatic solvents, their relatively low molecular weight, their ability to be easily molded, and the ability of the polymers of the bicycloheptene-allyl esters to thermally cure into hard, insoluble, higher molecular weight products.

The copolymers of the present invention can have a wide range of properties, and are thereby useful in various areas of application. Copolymers of the present invention, for example, are useful in the manufacture of pressure sensitive adhesives, wherein a solution of the copolymer in aromatic solvent, such as xylene, is coated on a tile or other article and covered with a vegetable parchment paper as a backing. The backing is then stripped off and the tile placed into position. Upon thermal treatment, the tile is permanently bonded to the base material.

I claim:
1. A compound of the formula:

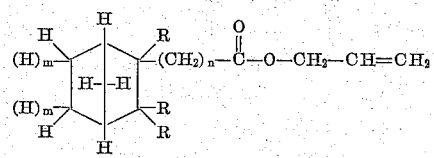

wherein R is selected from the group consisting of hydrogen and an alkyl group containing from 1 to 4 carbon atoms, *m* is an integer from 0 to 1, provided that when *m* is 0 a carbon-to-carbon double bond is present between the 5- and 6-postion ring carbon atoms, and *n* is an integer from 0 to 10.
2. Allyl bicyclo[2.2.1]hept-5-en-2-carboxylate.
3. Allyl bicyclo[2.2.1]hept-5-en-2-acetate.
4. Allyl 2-methylbicyclo[2.2.1]hept-5-en-2-carboxylate.
5. Allyl bicyclo[2.2.1]heptan-2-carboxylate.
6. Allyl 2-methylbicyclo[2.2.1]hept-5-en-2-acetate.
7. A new composition of matter comprising a solid homopolymer having reoccurring structural units of the formula

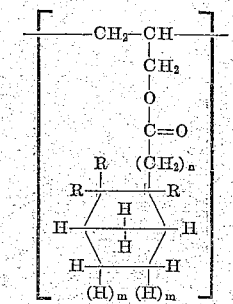

wherein R is selected from the group consisting of hydrogen and an alkyl group containing from 1 to 4 carbon atoms, *m* is an integer from 0 to 1, provided that when *m* is 0 a carbon-to-carbon double bond is present between the 5- and 6-position ring carbon atoms, and *n* is an integer from 0 to 10.
8. A new composition of matter comprising a solid homopolymer of allyl bicyclo[2.2.1]hept-5-en-2-carboxylate having reoccurring structural units of the formula

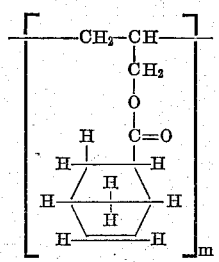

wherein $m$ is an integer from 5 to 25.

9. A new composition of matter comprising a solid homopolymer of allyl bicyclo[2.2.1]hept-5-en-2-actate having reoccuring structural units of the formula

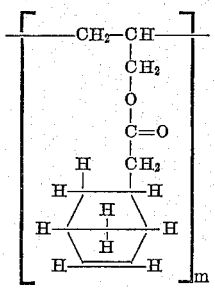

wherein $m$ is an integer from 5 to 25.

10. A new composition of matter comprising a solid homopolymer of allyl bicyclo[2.2.1]hept-5-en-2-carboxylate having reoccurring structural units of the formula

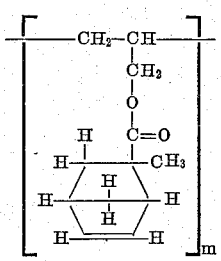

wherein $m$ is an integer from 5 to 25.

11. A solid, aromatic hydrocarbon insoluble polymer prepared by heating a homopolyer of claim 7, wherein $m$ is 0 and a carbon-to-carbon double bond is present between the 5- and 6-position ring carbon atoms, at a temperature of between 200° C. and 500° C.

12. A solid copolymer formed by reacting under polymerization conditions in the presence of a free radical polymerization catalyst at a temperature of from about 25° C. to about 200° C., a compound of claim 1 with a compound of the formula

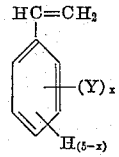

wherein Y is selected from the group consisting of chlorine, bromine, carboxyl, methyl, ethyl, and mixtures thereof; and $x$ is an integer from 0 to 2.

13. A new composition of matter comprising a solid copolymer formed by reacting a compound of claim 1 with styrene under polymerization conditions in the presence of a free radical polymerization catalyst at a temperature of from about 25° C. to about 200° C.

14. A new composition of matter comprising a solid copolymer formed by reacting under polymerization conditions in the presence of a free radical polymerization catalyst at a temperature of from about 25° C. to about 200° C., a compound of claim 1 with a compound having the formula

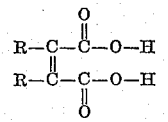

wherein R is selected from the group consisting of hydrogen and an alkyl radical containing from 1 to 4 carbon atoms, and their anhydrides.

15. A new composition of matter comprising a solid copolymer formed by reacting a compound of claim 1 with maleic acid under polymerization conditions in the presence of a free radical polymerization catalyst at a temperature of from about 25° C. to about 200° C.

References Cited in the file of this patent

UNITED STATES PATENTS 3,033,848    Caldwell _____ May 8, 1962

FOREIGN PATENTS 582,721    Great Britain _____ Nov. 26, 1946